United States Patent
Blaum et al.

(10) Patent No.: US 9,454,333 B2
(45) Date of Patent: Sep. 27, 2016

(54) PARITY LOGS FOR RAID SYSTEMS WITH VARIABLE CAPACITY MEDIA

(71) Applicant: International Business Machines Corporation, Armonk, NY (US)

(72) Inventors: Mario Blaum, San Jose, CA (US); Veera W. Deenadhayalan, San Jose, CA (US); Steven R. Hetzler, Los Altos, CA (US); Wayne C. Hineman, San Jose, CA (US); Robert M. Rees, Los Gatos, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 14/524,829

(22) Filed: Oct. 27, 2014

(65) Prior Publication Data

US 2016/0117133 A1    Apr. 28, 2016

(51) Int. Cl.
*G06F 13/00* (2006.01)
*G06F 3/06* (2006.01)
(Continued)

(52) U.S. Cl.
CPC .......... *G06F 3/0689* (2013.01); *G06F 3/0604* (2013.01); *G06F 3/0644* (2013.01); *G06F 3/0601* (2013.01); *G06F 12/0238* (2013.01); *G06F 12/0646* (2013.01)

(58) Field of Classification Search
CPC .. G06F 3/0601; G06F 3/0604; G06F 3/0644; G06F 3/0689; G06F 12/0238; G06F 12/0646
USPC .......... 711/114, 154, 163; 710/52, 104, 120; 712/10, 16, 27
See application file for complete search history.

(56) References Cited

U.S. PATENT DOCUMENTS

| 3,798,614 A | 3/1974 | Meadows et al. |
| 5,233,618 A | 8/1993 | Glider et al. |

(Continued)

FOREIGN PATENT DOCUMENTS

| FR | 2900294 A1 | 10/2007 |
| JP | 2005149374 A | 6/2005 |

(Continued)

OTHER PUBLICATIONS

Qing Yang et al., "Trap-Array: A Disk Array Architecture Providing Timely Recovery to Any Point-in-time." In ACM SIGARCH Computer Architecture News, vol. 34, No. 2, pp. 289-301. IEEE Computer Society, 2006.

(Continued)

*Primary Examiner* — Reba I Elmore
(74) *Attorney, Agent, or Firm* — Mohammed Kashef (57) ABSTRACT

Embodiments of the invention provide parity logs for raid systems with variable-capacity media. In one embodiment, a system includes a first set of data storage media devices having variable capacity. The storage devices include a data portion of a parity data set for storing write data being striped to the first. The system further includes a second set of data storage media devices having variable capacity. The second set includes a linear address space of blocks for storing a parity portion of the parity data set. The linear address space is written in a log form. The first and second sets comprise at least one array in a RAID configuration. The system writes the parity portion of the parity data set to the second set, which enables each storage device among the first set to be written to full capacity.

20 Claims, 4 Drawing Sheets (51) Int. Cl.
*G06F 12/02* (2006.01)
*G06F 12/06* (2006.01)

(56) References Cited

U.S. PATENT DOCUMENTS

| | | | | |
|---|---|---|---|---|
| 5,561,672 | A | * | 10/1996 | Kaneko .................. G06F 3/0601 710/53 |
| 5,583,995 | A | * | 12/1996 | Gardner .............. G06F 11/1076 348/E7.071 |
| 5,615,335 | A | * | 3/1997 | Onffroy .................. G11C 29/12 714/25 |
| 5,758,057 | A | * | 5/1998 | Baba ................... G06F 11/0727 711/114 |
| 6,122,685 | A | * | 9/2000 | Bachmat ................. G06F 3/061 710/18 |
| 7,155,634 | B1 | | 12/2006 | Le Graverand et al. |
| 2002/0156975 | A1 | | 10/2002 | Staub et al. |
| 2004/0083420 | A1 | | 4/2004 | Oldfield et al. |
| 2006/0136778 | A1 | | 6/2006 | Graverand et al. |
| 2011/0314219 | A1 | | 12/2011 | Ulrich et al. |
| 2012/0030425 | A1 | | 2/2012 | Becker-Szendy et al. |

FOREIGN PATENT DOCUMENTS

| | | |
|---|---|---|
| WO | WO2012142027 A2 | 10/2012 |
| WO | WO2013114230 A1 | 8/2013 |

OTHER PUBLICATIONS

Danile Stodolsky et al., "Parity Logging Overcoming the Small Write Problem in Redundant Disk Arrays" In ACM SIGARCH Computer Architecture News, vol. 21, No. 2, pp. 64-75. ACM, 1993.

IBM TDB; "Counter-intuitive RAID Rebuild Algorithm for Virtual Tape Server"; http://www.ip.com/pubview/IPCOM000015294D; Jun. 20, 2003.

Mike Fisher, "Redundant Array of Independent Tape Rait"; Storage Technology Corporation; michael_fisher@storagetek.com; The Premier Advanced Recording Technology Forum; Oct. 4, 2000.

List of IBM Patents or Patent Applications Treated as Related, Oct. 28, 2014.

Mario Blaum et al., "Time Multiplexed Redundant Array of Independent Tapes" U.S. Appl. No. 14/524,133, filed Oct. 27, 2014.

* cited by examiner

PARITY LOGS FOR RAID SYSTEMS WITH VARIABLE CAPACITY MEDIA

BACKGROUND

Embodiments of the invention relate to data storage, and in particular, to parity logs for RAID systems with variable capacity media.

All disk devices in a RAID array are accessible at the same time for write operations. RAID stripes are fixed-size, and laid out based on the size of the array. Therefore, the entire stripe may be written essentially in parallel, including the parity.

Tape drives are typically few in number, relative to the number of tape spools/cartridges that hold data, which is quite different than the architecture of disk-based storage systems. It is less likely that all of the tape spools in a Redundant Array of Independent Tapes (RAIT) array are mounted and available at the time of a write operation. Thus, tapes in a RAIT-based storage system a likely to be written consecutively, and not in parallel as disk-based RAID systems typically do.

Tapes have different physical lengths. For instance, tapes' lengths vary due to manufacturing tolerances or differing defect impacts. The capacity of a tape may not be known until the write operation to that tape is complete. Therefore, it is impossible to predetermine the amount of data that can be written to a RAIT array, as is typically done in a disk-based RAID system, because of the varying capacity of tape volumes that part of a RAIT array.

SUMMARY

Embodiments of the invention include a system, method, and computer program product for providing parity logs for RAID systems with variable capacity media. The capacity of each storage media device having variable-capacity is not known before a write to each is complete. In one aspect of the invention, a system includes a first set of data storage media devices having variable capacity. The data storage media devices include a data portion of a parity data set for storing write data being striped to the first set of data storage media devices.

The system further includes a second set of data storage media devices having variable capacity. The second set of data storage media devices includes a linear address space of blocks for storing a parity portion of the parity data set. The linear address space is written in a log form. The first and second sets of data storage media devices comprise at least one array in a RAID configuration. The system writes the parity portion of the parity data set to the second set of data storage media devices, which enables each data storage media device among the first set data storage media devices to be written to full capacity.

Details of the embodiments of the invention are described below in the Detailed Description section in reference to the accompanying drawings. The Brief Summary is intended to provide an overview of the claimed subject matter and is not intended to limit the scope of the claimed subject matter. Other features and advantages of this invention will become apparent from the following Detailed Description.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

The following Detailed Description of the embodiments of the system, method, and computer program product of the present invention, as presented in the figures, is not intended to limit the scope of the invention, as claimed, but is merely representative of selected embodiments of the invention. The architecture of the present invention, as generally described and illustrated in the figures herein, may be arranged and designed in a wide variety of different configurations. Thus, the following detailed description is intended only by way of example, and simply illustrates certain selected embodiments of systems and processes that are consistent with the invention as claimed herein.

Embodiments of the invention provide parity logs for RAID systems with variable-capacity media. For instances, the invention provides a parity scheme for use with, but not limited to, RAIT systems. The nomenclature for RAIT levels will be the same as for RAID, e.g. RAIT 4 or RAIT 5 will refer to a single parity arrangement, RAIT 6 to dual parity, etc., as it is in disk-based RAID storage systems.

RAIT arrays are comprised of tapes that can have significant variation in capacity from one spool/cartridge to the next. Whereas disk-based storage with individual devices in a RAID array are pre-formatted to have identical block capacities. Therefore, the data capacity of each tape cartridge will not be known in advance of writing it like can be for disk.

Parities cannot be pre-computed, assuming a uniform block count for all stripes, when tapes have differing capacities and each tape is written to its full capacity. Even computing parities on the fly only when they need to be written cannot ensure each stripe is properly complete, due to the variable capacity of tapes. A system can keep track of the set of data strips comprising each stripe. This can be achieved a number of ways, including assuming the contents of strips that were not written to be strips of zeroes. However, the last stripe containing a single strip on a tape can still be a problem where the designated parity tape did not have enough capacity to allow protection for all strips.

In another example, one may mark the last strip on the tape as not written, and instead write it to a subsequent stripe set in a different RAIT array. However, only the stripes whose length is less than or equal to that next tape would have proper protection and there would be more data strips to move to a subsequent stripe set, if the next tape was written last in the sequence.

Another example, the designated parity tape has the greatest capacity (is the longest) and provides RAIT protection to all data strips. However, it is also impossible to know in advance what tape has the greatest capacity so that it can be used for parity. This is the case even if statistics were kept to aid in tape selection decisions because a tape may not have the same capacity in subsequent write passes, due to cumulative media defects.

In yet another example, on-the-fly parity computation is combined with dynamic trimming. This approach keeps the number of blocks of the RAIT stripe constant, but the set in each stripe is determined on the fly. Dynamic trimming involves keeping a tape length during the process of writing the stripes. Unless able to back-hitch and re-write a tape, the last data strips will have to be relocated from tapes to the next stripe set. The last data strips in tapes are marked as not written, and parities are written to the last tape. Additional data strips would have to be marked as not written in this stripe set and rewritten to the next stripe set, if the last tape was shorter than the previously noted length. Additional data strips would have to be marked as not written in this stripe set and rewritten to the next stripe set.

The present invention manages the capacity variation when writing the parity checks for the given level of RAIT arrays, and maximizes space-efficiency of data in the array by utilizing each tape's full capacity. The techniques employed by the present invention protect all of the stripes in a stripe set of the array when writing the parity checks for a level of the RAID configuration by utilizing each tape's (in the first set) full capacity.

Embodiments of the present invention allow each data tape to be written to its full capacity and write all parities to virtual parity logs. This is rather than trying to make the variable capacity nature of tapes conform to traditional fixed-capacity RAID systems. A virtual parity log in the context of this invention comprises a set of data storage media devices having variable capacity and a linear address space of blocks for storing a parity portion of the parity set. The linear address space is written in a log form.

For example, in a RAIT 4 scheme, there would be no problem if the parity tape had space for one more data strip. The system can keep track of the set of data blocks comprising each stripe, including assuming the contents of blocks not written as blocks of zeroes. Thus, the last stripe, comprised of the last data strip in a second tape and blocks of zeroes for other data tapes, would effectively be 1+P (i.e. mirrored) in the parity. While writing the last tape (fourth), a system wouldn't know if the tape has enough physical capacity to fully protect all of the stripes until either meeting the capacity requirement for the stripe set or encounter the end of the tape before meeting the capacity requirement. However, if tape 4 was a virtual tape, then the system need not rely on its physical capacity being as large as the data tape with the greatest capacity. Accordingly, the system can guarantee that all of the stripes in the stripe set can be protected from a capacity standpoint.

A virtual tape in this context of this invention is a linear address space of blocks on tape-based media. This address space is constructed in log-structured fashion, which is mapped on to physical tapes. Thus, a virtual parity log is a log-structured address space made up of tapes that are logically concatenated, and used exclusively to hold parity. Writes to the virtual parity log are always placed at the end of the log, in the same manner as writes to a log-structured file system. The system must keep track of which segments of the virtual parity log belong to which RAIT arrays, thereby keeping track of what log segments correlate to the parity data set of tapes used for storing the parity portion of the parity data set.

Figure 1:
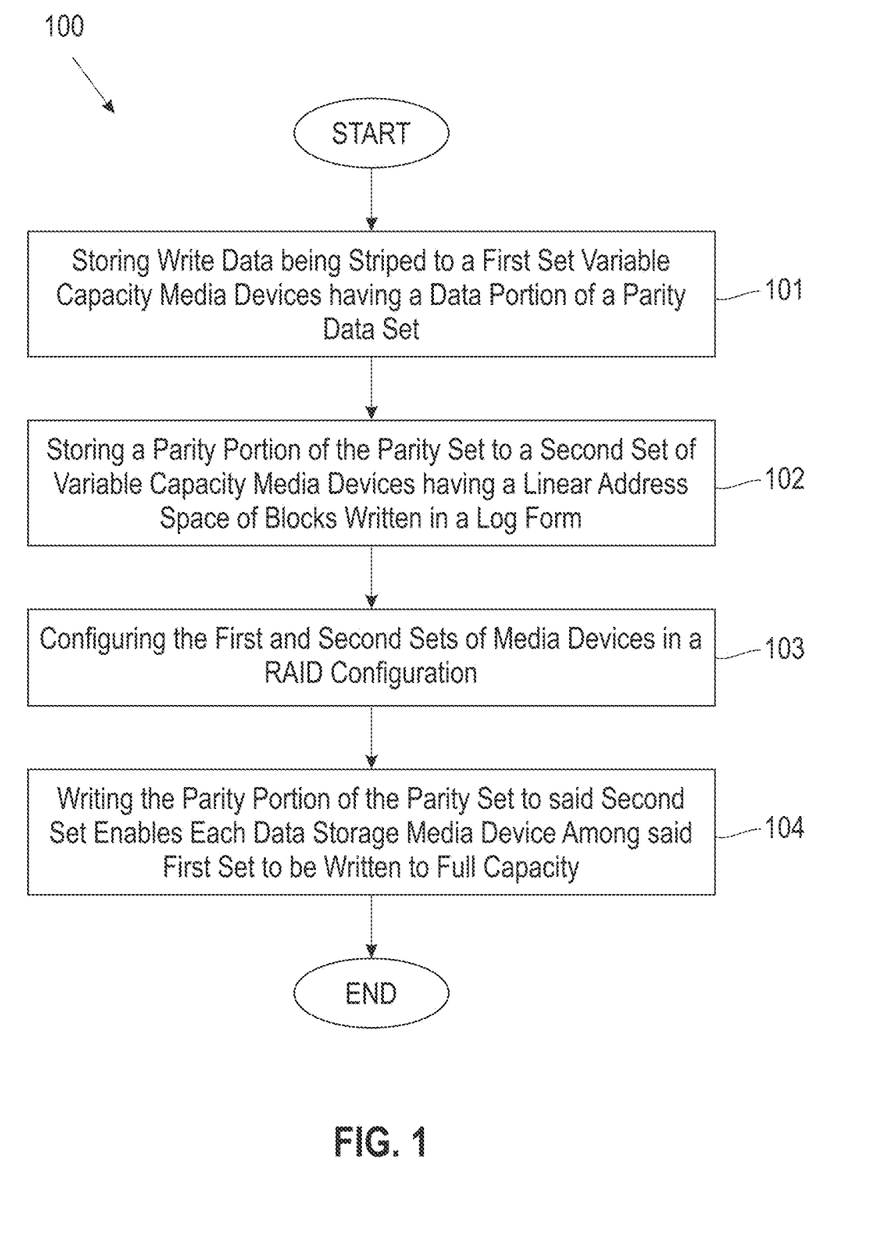
FIG. 1 depicts a flow chart illustrating a process for providing parity logs for RAID systems with variable capacity media, according to one embodiment.

FIG. 1 depicts a flow chart illustrating a process (100) for providing parity logs for RAID systems with variable capacity media. The process begins with storing write data being striped to a first set of data storage media devices having variable capacity and that comprise a data portion of a parity data set (step 101). The process then proceeds to storing a parity portion of the parity data set to a second set of data storage media devices having variable capacity and a linear address space of blocks (step 102). The second set of data storage media devices is also referred to as the virtual parity log in this detailed description. The linear address space being written in a log form. The first and second sets comprise at least one array in a RAID configuration (i.e., RAIT) (step 103). Writing the parity portion of the parity data set to the second set thereby enables each data storage media device among the first set to be written to full capacity (step 104).

Figure 2:
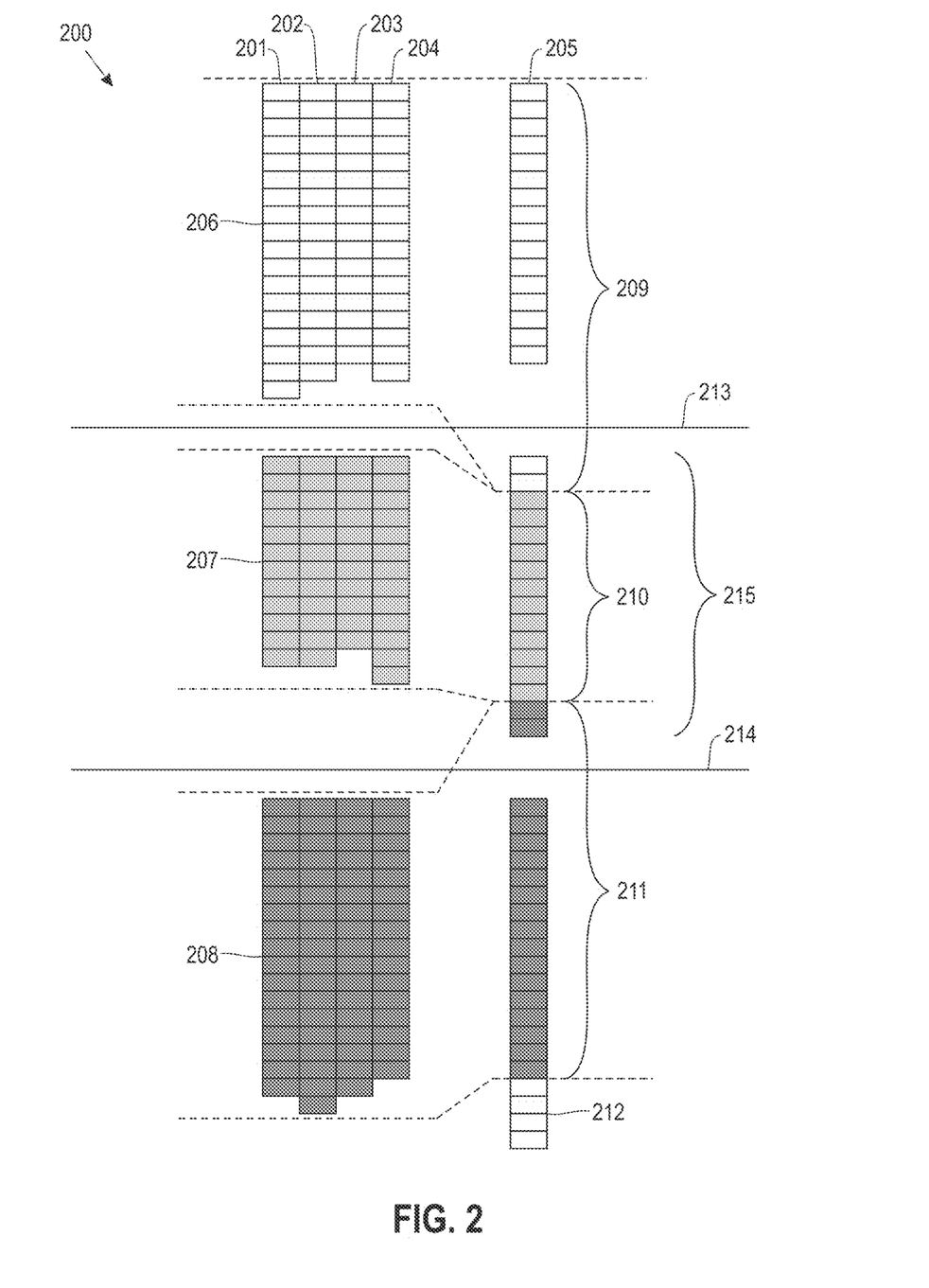
FIG. 2. depicts a diagram illustrating a tape-based storage system with a first set of data storage media devices in storage arrays, each array having a single parity written to data storage media devices of a second set comprising a parity log that crosses physical tape boundaries, according to one embodiment.

FIG. 2. depicts a diagram illustrating a tape-based storage system (200) with a first set of data storage media devices (201, 202, 203, 204) in storage arrays (206, 207, 208), each array having a single parity written to data storage media devices of a second set comprising a parity log (205) that crosses physical tape boundaries (213, 214).

The parity (209, 210, 211) for a single array written to the virtual parity log may cross physical tape boundaries (213, 214) because the address space is virtual. Likewise, parities for different RAIT arrays (206, 207, 208), may reside in whole or in part on the same physical tape (215). The number of RAIT arrays whose parities are located on the same physical tape should be limited, however, because losing such a tape would multiply the number of tapes required to read to rebuild the lost parity tape.

The system may demount a full tape and mount an empty tape transparently to the writing application when writing parity for a RAIT array to the virtual parity log. This leaves the new tape only partially filled (212). Subsequent writes to the new tape with parity for a different RAIT array could be appended at a later time. Alternatively, when a tape becomes full, the system may buffer and stage remaining parities for the RAIT array on some other (disk-based) media, and perform the tape writes at a later time. In one embodiment, enough parity data to completely fill a tape in the buffer may be collected, and then the parity data is streamed to tape. This buffering scheme for streaming parity data to tape avoids capacity loss on the tape media due to temperature and humidity changes caused by multiple mounts of the same tape for writing at different times.

In one embodiment, for stripes that need to have their strips on storage media devices that have insufficient storage capacity compared to other devices in the first set, the system uses blocks of zeros in place of such strips to compute parity of the stripe and for reconstruction of data stored in such stripes. In another embodiment following a loss of a data storage media device among said first set, data stored on the parity data set is recovered by reading parity information from storage media devices among the second set when the parity information for the set of devices spans multiple devices in one or more logs.

Figure 3:
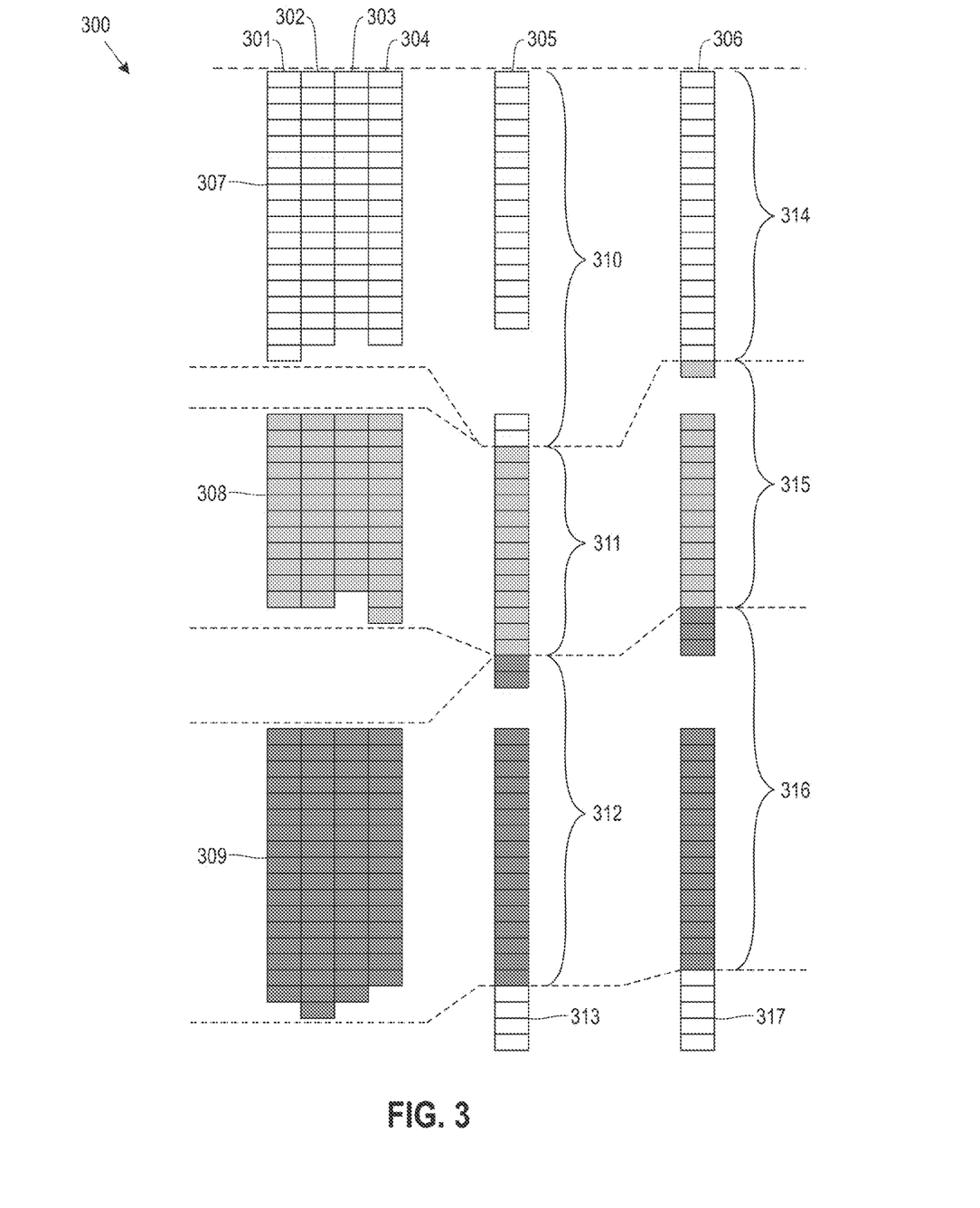
FIG. 3. depicts a diagram illustrating a tape-based storage system with a first set of data storage media devices in storage arrays, each array having multiple parity written to data storage media devices of a second set comprising parity logs that cross physical tape boundaries, according to one embodiment.

FIG. 3. depicts a diagram illustrating a tape-based storage system (300) with a first set of data storage media devices (301, 302, 303, 304) in storage arrays (307, 308, 309), each array having multiple parity written to data storage media devices of a second set comprising parity logs (305, 306) that cross physical tape boundaries. Just as the data elements that make up a stripe are physically segregated on individual tapes, distinct parities for a RAIT array must also be physically segregated. If an array has multiple parities, P and Q, then each must be placed on physically separate tapes in the second set used for storing the parity portion of the parity data set. Similarly, the system may demount a full tape and mount an empty tape transparently to the writing application when writing parity for a RAIT array to any of the virtual parity logs. This leaves the new tape only partially filled (313, 317).

In one embodiment, separate virtual parity logs P (305), and Q (306) are used, and have a unique set of tapes in each log. For instance, each parity P (310, 311, 312) and Q (314, 315, 316) is placed on physically separate storage media devices of the second set by using separate logs (305, 306) for each of the parities P and Q being written to the second set. The loss of a single tape would be as if multiple failures occurred simultaneously if the parities for an array, P and Q, are co-mingled on the same physical tape. The loss of such a single tape could result in data loss, if the RAIT scheme could not tolerate that many failures.

It is also possible to have multiple parities that share a single virtual parity log. This is possible only when the individual parities are placed on physically separate tapes within the log. Similarly, the loss of that tape may result in data loss accordingly with the strength of the RAIT scheme being used if multiple parities for the same array are co-mingled on the same physical tape.

The storage space consumed in the virtual parity log for such arrays can also be considered reclaimable when RAIT arrays are reclaimed or re-written. Free space can be reclaimed in similar fashion to typical log-structured system garbage collection. The garbage collection process may leave behind fragments of parity data on a tape, thus preventing the tape being reused. Such fragments can be relocated to a different tape, so long as it is not co-mingled with a different parity of the same RAIT array on the same physical tape such that does not comprise a different parity of the same array. Likewise, parity fragments from the same RAIT array from different segments of the virtual parity log can be merged during the garbage collection process. Such segments should be rewritten to the new tape in stripe order. Disk buffering can be used to temporarily hold reclaimed parity for later write to tape.

Figure 4:
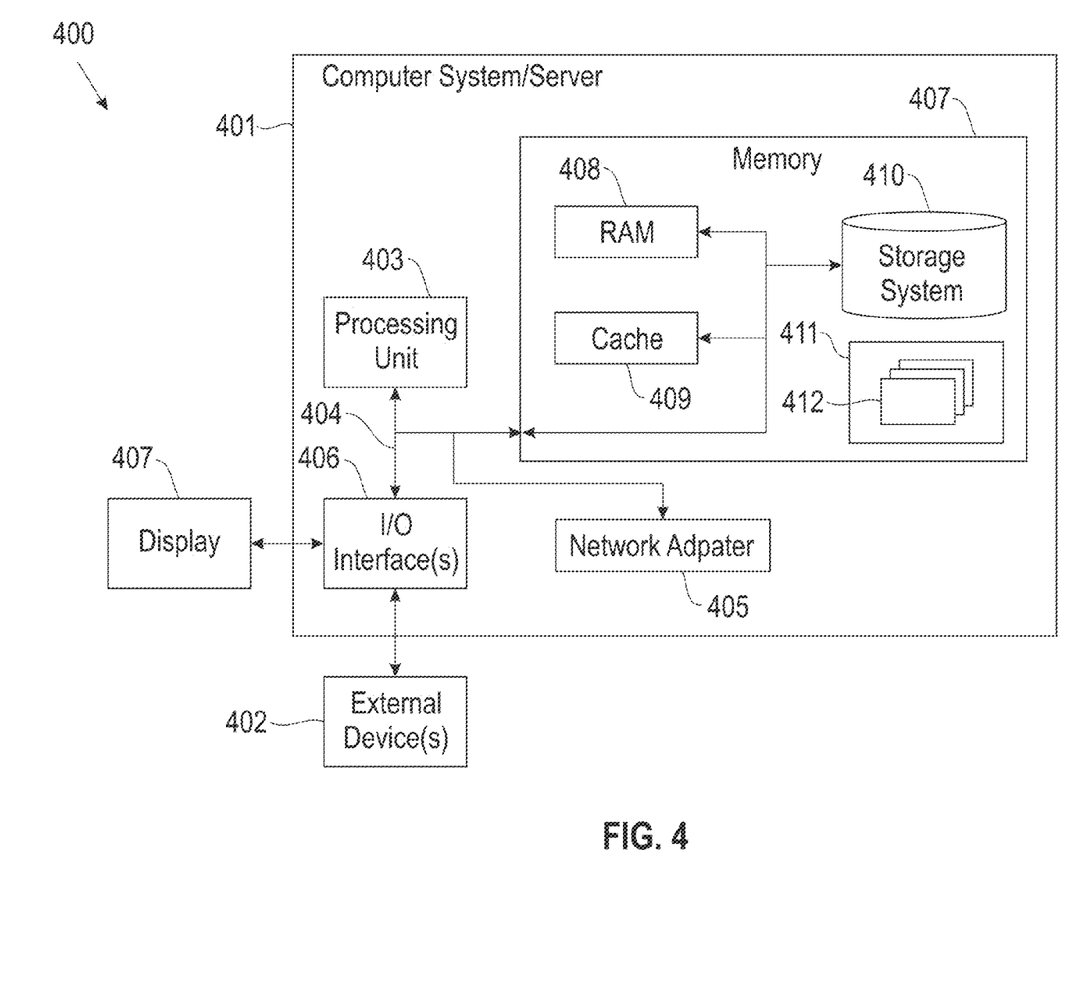
FIG. 4 depicts a block diagram illustrating an exemplary general-purpose computing architecture for implementing embodiments of the present invention.

FIG. 4 depicts a block diagram illustrating an exemplary general-purpose computing architecture (400) for implementing embodiments of the present invention. The architecture includes a computer system (401) (hereinafter "computer"). The components of the computer may include, but are not limited to, one or more processors or processing units (403), a system memory (407), and a bus (404) that couples various system components together, including the system memory to the processing units. The computer can serve as a cloud computing code and is operational with numerous other general purpose or special purpose computing system environments or configurations.

Examples of well-known computing systems, environments, and/or configurations that may be suitable for use with the computer include, but are not limited to: personal computer systems; server computer systems; thin clients; thick clients; hand-held or laptop devices; multiprocessor systems; microprocessor-based systems; set top boxes; programmable consumer electronics; network PCs; minicomputer systems; mainframe computer systems; clustered file systems; computing clusters; scalable storage subsystems; and distributed cloud computing environments that include any of the above systems or devices, and the like.

The bus represents one or more of any of several types of bus structures, including a memory bus or memory controller, a peripheral bus, an accelerated graphics port, and a processor or local bus using any of a variety of bus architectures. By way of example, and not limitation, such architectures include: Industry Standard Architecture (ISA) bus; Micro Channel Architecture (MCA) bus; Enhanced ISA (EISA) bus; Video Electronics Standards Association (VESA) local bus; and Peripheral Component Interconnects (PCI) bus. The computer typically includes a variety of computer system readable media. Such media may be any available media that is accessible by the computer, and it includes both volatile and non-volatile media, removable and non-removable media.

The system memory can include computer system readable media in the form of volatile memory, such as random access memory (RAM) (408) and/or cache memory (409). The computer may further include other removable/non-removable, volatile/non-volatile computer system storage media. By way of example only, a storage system or storage subsystem (410) can be provided for reading from and writing to a permanent storage (not shown and typically called a "hard disk drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the memory may include at least one program product having a set (e.g., at least one) of program modules that are configured to carry out the functions of embodiments of the invention.

The computer may be described in the general context of computer system-executable instructions, such as program modules, being executed by a computer system. Generally, the program modules may include routines, programs, objects, components, logic, data structures, and so on that perform particular tasks or implement particular abstract data types. The computer may be practiced in distributed cloud computing environments where tasks are performed by remote processing devices that are linked through a communications network. In a distributed cloud computing environment, the program modules may be located in both local and remote computer system storage media including memory storage devices.

The program/utility (411), having a set (at least one) of program modules (412), may be stored in the system memory or storage system by way of example, and not limitation, as well as an operating system, one or more application programs, other program modules, and program data. Each of the operating systems, one or more application programs, other program modules, and program data or some combination thereof, may include an implementation of a networking environment. Program modules generally carry out the functions and/or methodologies of embodiments of the invention as described herein.

The computer may also communicate with one or more external devices (402), such as a keyboard, a pointing device, a display (407), etc.; one or more devices that enable a user to interact with the computer; and/or any devices (e.g., network card, modem, etc.) that enable computer to communicate with one or more other computing devices. Such communication can occur via I/O interfaces (406). Still yet, the computer can communicate with one or more networks such as a LAN, a general WAN, and/or a public network (e.g., the Internet) via network adapter (405). As depicted, the network adapter communicates with the other components of the computer via the bus. It should be understood that although not shown, other hardware and/or software components could be used in conjunction with computer. Examples, include, but are not limited to microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What we claim is:

1. A system, comprising:
   a first set of data storage media devices having variable capacity and that comprise a data portion of a parity data set for storing write data being striped to said first set;
   a second set of data storage media devices having variable capacity and a linear address space of blocks for storing a parity portion of the parity data set, said linear address space being written in a log form; and
   wherein said first and second sets comprise at least one array in a RAID configuration, and writing the parity portion of the parity data set to said second set enables each data storage media device among said first set to be written to full capacity.

2. The system of claim 1, wherein the address space is physically mapped to devices among the second set.

3. The system of claim 1, wherein the system keeps track of log segments that correlate to said first set.

4. The system of claim 1, wherein if said array has multiple parities, each distinct parity is written to physically separate data storage media devices among said second set.

5. The system of claim 4, wherein each distinct parity is placed on physically separate storage media devices of the second set by using separate logs for each the data storage media devices of the first set.

6. The system of claim 1, wherein the system demounts a data storage media device of the second set that is full and mounts an empty storage media device transparently to a writing application when writing parity for said array.

7. The system of claim 6, wherein a different array is appended at a later time for subsequent parity writing.

8. The system of claim 1, further comprising:
   a memory device for buffering and/or staging parity data that would exceed storage capacity of a variable-capacity device among said second set if written.

9. The system of claim 8, wherein parity data is buffered until sufficient parity data has been buffered that would fill a single storage media device among said second set and then streamed to said single device.

10. The system of claim 9, wherein said buffering avoids capacity loss, on storage media devices among the second set, due to temperature and humidity changes caused by mounting of a same store media device for writing at different times.

11. The system of claim 1, wherein following a loss of a data storage media device among said first set, data stored on the parity data set is recovered by reading parity information from storage media devices among the second set when the parity information for the set of devices spans multiple devices in one or more logs.

12. The system of claim 1, wherein for stripes that need to have their strips on storage media devices that have insufficient storage capacity compared to other devices in the first set, the system uses blocks of zeros in place of such strips to compute parity of the stripe and for reconstruction of data stored in such stripes.

13. The system of claim 1, wherein storage capacity in the second set used by the log is reclaimable.

14. The system of claim 13, wherein the system relocates fragments of said parity portion not reclaimed to a different storage media device among said second set that does not comprise a different parity of the same array.

15. The system of claim 14, wherein parity fragments from the array from different segments of the log are merged during reclaim process and segments are re-written to a new storage media device among second set in stripe order.

16. The system of claim 1, wherein the storage system thereby manages capacity variation of the first set of devices and protects all of stripes in a stripe set of the array when writing the parity checks for a level of the RAID configuration by utilizing each of the first set of devices' full capacity.

17. The system of claim 1, wherein the storage media devices among the second set are logically concatenated together.

18. A method, comprising:
   storing write data being striped to a first set of data storage media devices having variable capacity and that comprise a data portion of a parity data set;
   storing a parity portion of the parity data set to a second set of data storage media devices having variable capacity and a linear address space of blocks, the linear address space being written in a log form; and
   wherein said first and second sets comprise at least one array in a RAID configuration, and writing the parity portion of the parity data set to said second set enables each data storage media device among said first set to be written to full capacity.

19. The method of claim 1, wherein said writing thereby manages capacity variation of the first set of devices and protects all of stripes in a stripe set of the array when writing the parity checks for a level of the RAID configuration by utilizing each of the first set of devices' full capacity.

20. A computer program product comprising a non-transitory computer readable storage medium having computer usable program code embodied therewith, said program code being executable to:
   store write data being striped to a first set of data storage media devices having variable capacity and the comprise a data portion of a parity data set;
   store a parity portion of the parity data set to a second set of data storage media devices having variable capacity and a linear address space of blocks, the linear address space being written in a log form; and
   wherein said first and second sets comprise at least one array in a RAID configuration, and write the parity portion of the parity data set to said second set enables each data storage media device among said first set to be written to full capacity.

* * * * *